(12) United States Patent
Obata et al.

(10) Patent No.: US 8,250,539 B2
(45) Date of Patent: Aug. 21, 2012

(54) METHOD OF DETECTING MEMORY LEAK CAUSING PORTION AND EXECUTION PROGRAM THEREOF

(75) Inventors: Motoki Obata, Yokohama (JP); Hiroyasu Nishiyama, Kawasaki (JP)

(73) Assignee: Hitachi, Ltd., Tokyo (JP)

( * ) Notice: Subject to any disclaimer, the term of this patent is extended or adjusted under 35 U.S.C. 154(b) by 438 days.

(21) Appl. No.: 12/635,135

(22) Filed: Dec. 10, 2009

(65) Prior Publication Data

US 2010/0153922 A1 Jun. 17, 2010

Related U.S. Application Data

(63) Continuation of application No. 11/103,565, filed on Apr. 12, 2005, now abandoned.

(30) Foreign Application Priority Data

Apr. 12, 2004 (JP) ................................. 2004-116581

(51) Int. Cl.
G06F 9/44 (2006.01)
G06F 11/00 (2006.01)
(52) U.S. Cl. ......................................... 717/124; 714/38
(58) Field of Classification Search .................... None
See application file for complete search history.

(56) References Cited

U.S. PATENT DOCUMENTS

| 6,167,535 | A | 12/2000 | Foote et al. |
| 6,370,684 | B1 | 4/2002 | De Pauw et al. |
| 7,234,080 | B2 | 6/2007 | Cirne et al. |
| 7,293,142 | B1 | 11/2007 | Xu et al. |
| 7,577,943 | B2 * | 8/2009 | Chilimbi et al. ............... 717/130 |
| 2004/0078540 | A1 | 4/2004 | Cirne et al. |
| 2004/0172579 | A1 | 9/2004 | Fu |
| 2005/0071460 | A1 | 3/2005 | Mitchell et al. |
| 2005/0076184 | A1 | 4/2005 | Schumacher |
| 2007/0033365 | A1 | 2/2007 | Vaidyanathan et al. |
| 2009/0328007 | A1 * | 12/2009 | Chen et al. ..................... 717/128 |
| 2010/0153922 | A1 * | 6/2010 | Obata et al. .................... 717/124 |

OTHER PUBLICATIONS

David L. Heine and Monica S. Lam, "A Practical Flow-Sensitive and Context Sensitive C and C++ Memory Leak Detector", Proc. of the ACM SIGPAN 2003 conference on Programming language design and implementation 2003 pp. 168-181.

Wim De Pauw and Gary Sevitsky, "Visualizing References Patterns for Solving Memory Leaks in Java", Proc. of the 13th European Conference on Object-Oriented Programming, 1999.

* cited by examiner

*Primary Examiner* — Li Zhen
*Assistant Examiner* — Evral Bodden
(74) *Attorney, Agent, or Firm* — Antonelli, Terry, Stout & Kraus, LLP.

(57) ABSTRACT

With regard to a plurality of data stored in a memory, relationship of data is grasped twice after a time interval therebetween. Next, increased data C1, E2, E3 which are not present in data of a first time are extracted from data of a second time, and weights "1", "2", "2" in accordance with data sizes are attached to the increased data. Next, the weights are successively propagated from a lower order data of a destination of reference to a higher order data of a source of reference successively. When there are a plurality of lower order data E2, E3 for a higher order D0, a weight constituted by adding the weights "2", "2" of the plurality of lower data E2, E3 is made to be a weight "4" of the higher order data D0, and the weights of the respective data represent leak scores which causes memory leak.

18 Claims, 11 Drawing Sheets

REFERENCE RELATIONSHIP GRASPED AT FIRST TIME

REFERENCE RELATIONSHIP GRASPED AT SECOND TIME

| ORDER | INCREASED SIZE | DATA KIND | WEIGHT EXAMPLE 1 | WEIGHT EXAMPLE 2 |
|---|---|---|---|---|
| 1 | 2 | DATA C | 1 | 1 |
| 2 | 10 | DATA E | 2 | 5 |

METHOD OF DETECTING MEMORY LEAK CAUSING PORTION AND EXECUTION PROGRAM THEREOF

CROSS REFERENCE TO RELATED APPLICATION

This is a continuation of U.S. application Ser. No. 11/103,565, filed Apr. 12, 2005 now abandoned. This application relates to and claims priority from Japanese Patent Application No. 2004-116581, filed on Apr. 12, 2004. The entirety of the contents and subject matter of all of the above is incorporated herein by reference.

BACKGROUND OF THE INVENTION

The present invention relates to a method of detecting a memory leak causing portion generated in executing a program described in a programming language of Java language or the like capable of tracking a data relationship with regard to a plurality of data stored in a memory of a computer and an execution program thereof.

As one of causes by which a computer program does not achieve a performance as expected, there is pointed out a phenomenon referred to as memory leak in which a data memory region used in the program continues to increase. Normally, data generated in executing a program is arranged at a memory region referred to as a heap region. The heap region is a kind of a memory region used in executing a program and is utilized for storing data a size of a storage region of which is dynamically determined such as data inputted to the program. In storing data, it is necessary to secure a storing region based on a size of data to be stored and when the data becomes unnecessary, an operation of releasing the ensured storage region is needed. When the operation of releasing the ensured region is not executed properly or when data of unfreed area become invisible from the executing system, there is generated a state in which the memory region used by the program continues to increase, that is, the memory leak.

Patterns of generating the memory leak can be classified broadly into two kinds. One is a memory leak happens in a language which explicitly executes an operation of releasing the region as in C language or C++ language and another is a memory leak happens in a language which implicitly releases the region as in Java language (Java is a trademark or a registered trademark of Sun Microsystems, Inc. in USA and other countries).

In a case of a language explicitly instructing release of region in the heap region as in C language or C++ language, a memory leak may occur due to a deficiency in release of region. Further, there may also occur a memory leak by disappearance of a reference to the data storage region ensured in the heap region when other reference is assigned erroneously to a field in the heap region holding the reference to the data storage region before release of the region. As a method of resolving the memory leak, there is a technology of monitoring allocation and release of a data region in executing a program, regarding a region which is not released as data causing memory leak and specifying a portion of memory leak as described in RATIONAL Software, "Purify: Fast Detection of Memory Leaks and Access Errors", Purify Product Information White Papers. (hereinafter, referred to as Non-patent Document 1) and a technology for preventing memory leak by static pointer analysis in compiling as described in David L. Heine and Monica S. Lam, "A Practical Flow-Sensitive and Context Sensitive C and C++ Memory Leak Detector", Proc. of the ACM SIGPLAN 2003 conference on Programming language design and implementation, 2003 (hereinafter, referred to as Non-patent Document 2).

On the other hand, in the case of a programming language for implicitly executing data region release as in Java language, a garbage collection function of recovering an unnecessary data storing region can frequently be utilized. A program by Java language is temporarily converted into a program by an intermediate language and the program by the intermediate language is executed on a virtual machine. According to the program by Java language, release of the memory region is not designated but unnecessary data is collected by the garbage collection function provided to the virtual machine. The above-described implicit release of the data region means that, release of the memory region is not designated in the program per se by Java language but the region of data is released by the garbage collection function and the like. The garbage collection function is a function of collecting data deviated from the data reference relationship and therefore, when there is generated a reference for unnecessary data which is not anticipated by a programmer due to a failure in programming, data does not become an object of collecting by the garbage collection function and this causes a memory leak by which the necessary data continues to increase in the memory. That is, according to the garbage collection function, even in the case of data which is not needed for a user, the data having the data reference relationship does not become the object of data recovery.

As described above, in the case of a programming language as Java language, the operation of releasing the data region is not explicit and therefore, it is extremely difficult to specify the leak causing portion in the program, and the method of detecting a memory leak causing portion used for C language or C++ language cannot be used. Therefore, when memory leak is suspected with regard to a program by Java language, there have been developed a technology of indicating a data group whose an amount of memory usage is increased in the memory as described in, for example, U.S. Pat. No. 6,167,535 (hereinafter, referred as Patent Document 1), or U.S. Pat. No. 6,370,684 (hereinafter, referred to as Patent Document 2), a method of assisting to discover a portion of generating memory leak by illustrating a reference relationship with regard to a certain data selected from a data group as described in Wim De Pauw and Gary Sevitsky, "Visualizing Reference Patterns for Solving Memory Leaks in Java", Proc. of the 13th European Conference on Object-Oriented Programming, 1999 (hereinafter, referred to as Nonpatent Document 3).

With regard to memory leak generated in executing a program using a language which executes release of the data region implicitly, such as Java language, according to the background arts, only the data group whose amount of memory usage is increased in the memory as in Patent Documents 1, 2, mentioned above, or a reference relationship with regard to a certain data selected from the data group is illustrated as in Nonpatent Document 2, mentioned above, and further, in many cases, data in which memory leak is suspected is not frequently single, further, there are an enormous number of the reference relationship of data and therefore, there poses a problem that an investigation on a source of producing memory leak becomes a very difficult operation.

SUMMARY OF THE INVENTION

In view of the above-described problem of the related art, the object of the present invention is to provide a method of detecting a memory leak causing portion capable of reducing labor required for investigating a source of memory leak with regard to memory leak caused by executing a program using a language which does not explicitly indicate release of a data region, and an execution program thereof.

A first aspect of the invention with regard to a method of detecting a memory leak causing portion in order to achieve the above-described object is a method of detecting a memory leak causing portion generated in executing a program described in a programming language capable of tracking a reference relationship among data with regard to a plurality of data stored in a memory of a computer, the method comprising:

a first relationship grasping step of grasping the reference relationship among data with regard to a plurality of data stored in the memory;

a second relationship grasping step of grasping the reference relationship among data with regard to the plurality of data stored in the memory after the first relationship grasping step;

an increased data extracting step of extracting one or more pieces of increased data which are not present in the plurality of data whose reference relationship is grasped in the first relationship grasping step from among the plurality of data whose reference relationship is grasped at the second relationship grasping step; and a weighting step of attaching weights to each one or more pieces of the increased data extracted at the increased data extracting step in accordance with data size of each of the increased data, successively propagating the weights from lower order data of a destination of reference to higher order data of a source of reference successively, and in a propagation process of the weights, when one higher order data constitutes the reference relationship with a plurality of lower order data, adding the weights of the plurality of lower order data to constitute the weight of the one higher order data and making the weights of the respective data as leak scores indicating a possibility of causing the memory leak.

According to the second aspect of the invention with respect to the method of detecting a memory leak causing portion, in the weighting step of the first aspect of the invention, one or more pieces of the increased data are classified for respective data kinds and the weights in accordance with data sizes of respective data groups are attached to the classified data groups.

According to the third aspect of the invention with respect to the method of detecting a memory leak causing portion, the first or the second invention further comprises:

a highest leak score data extracting step of extracting a lower order data as a data having a high possibility of causing a memory leak when a plurality of data having a highest weight are present in respective weights of the plurality of data constituting the reference relationship and the plurality of data having the highest weight constitutes a relationship between the higher order data and the lower data.

According to the fourth aspect of the invention with respect to the method of detecting a memory leak causing portion, any one of the first to the third aspects of the invention further comprises:

a memory leak detecting step of investigating an amount of using the memory by a plurality of times and determining whether the memory leak is generated based on a result of the investigation of the plurality of times;

wherein the second relationship grasping step is executed in parallel with the time when it is determined that the memory leak is generated in the memory leak detecting step or thereafter.

According to a fifth aspect of the invention with respect to the method of detecting a memory leak causing portion, any one of the first to the fourth aspects of the invention further comprises:

a program cause portion extracting step of extracting a portion described with a data having a high possibility of causing the memory leak from the program.

According to a first aspect of the invention with respect to a program for detecting a memory leak causing portion in order to achieve the above-described object, there is provided a program for detecting a memory leak causing portion generated in executing a program described in a programming language capable of tracking a reference relationship among data with regard to a plurality of data stored in a memory of a computer, the program causes the computer to execute:

a first relationship grasping step of grasping the reference relationship among the data with regard to a plurality of data stored in the memory;

a second relationship grasping step of grasping the reference relationship among data with regard to the plurality of data stored in the memory after the first relationship grasping step;

an increased data extracting step of extracting one or more pieces of increased data which are not present in the plurality of data whose reference relationship is grasped in the first relationship grasping step from among the plurality of data whose reference relationship is grasped at the second relationship grasping step; and a weighting step of attaching weights to each of one or more pieces of the increased data extracted at the increased data extracting step in accordance with data sizes of each increased data, successively propagating the weights from lower order data of a destination of reference to higher order data of a source of reference successively, and in a propagation step of the weights, when one higher order data constitutes the reference relationship with a plurality of lower order data, adding the weights of the plurality of lower order data to constitute the weight of the one higher order data and making the weights of the respective data leak scores indicating a possibility of causing the memory leak.

According to a second aspect of the invention with respect to the program of detecting a memory leak causing portion, in the first aspect of the invention, the program causes the computer to execute:

a highest leak score data extracting step of extracting a lower order data as a data having a high possibility of causing a memory leak when a plurality of data having a highest weight are present in respective weights of the plurality of data constituting the reference relationship and a plurality of data having the highest weight constitutes a relationship between the higher order data and the lower data.

According to a third aspect of the invention with respect to the program of detecting a memory leak causing portion, in the first or the second aspect of the invention, the program causes the computer to execute:

a memory leak detecting step of investigating an amount of using the memory by a plurality of times and determining whether the memory leak is generated based on a result of the investigation of the plurality of times;

wherein the second relationship grasping step is executed in parallel with the time when it is determined that the memory leak is generated in the memory leak detecting step or thereafter.

According to a fourth aspect of the invention with respect to the program of detecting a memory leak causing portion, in any one of the first to the third aspects of the invention, the program causes the computer to execute:

a program cause portion extracting step of extracting a portion of a program where data having the high leak score is described from the program.

According to a fifth aspect of the invention with respect to the program of detecting a memory leak causing portion, in any of the first to the fourth aspects of the invention, the program causes the computer to execute:

a displaying step of displaying at least a result of the weighting step.

According to a sixth aspect of the invention with respect to the program of detecting a memory leak causing portion, in the fifth aspect of the invention, in the displaying step, a plurality of data grasped at the second relationship grasping step are displayed in a manner that the reference relationship is seen and the leak scores of the plurality of data are respectively displayed.

According to a seventh aspect of the invention with respect to the program of detecting a memory leak causing portion, in the fourth aspect of the invention, the program causes the computer to execute:

a displaying step of displaying a name of the data having the highest leak score, a declaration of a kind of the data, and a portion of describing the data in the program described in the programming language.

According to the invention, the weights are attached to the plurality of data constituting the reference relationship, the weights are made to constitute leak scores indicating a possibility of causing the memory leak and therefore, data being the source of causing the memory leak is easy to specify and labor required for investigating on the source of memory leak can be reduced.

BRIEF DESCRIPTION OF THE DRAWINGS

FIG. 6A shows a reference relationship grasped at the first reference relationship grasping step—and FIG. 6B shows a reference relationship grasped at the second reference relationship grasping step—;

DESCRIPTION OF THE PREFERRED EMBODIMENTS

An embodiment of a method of detecting a memory leak causing portion according to the present invention will be now explained in the followings in reference to the drawings.

Figure 1:
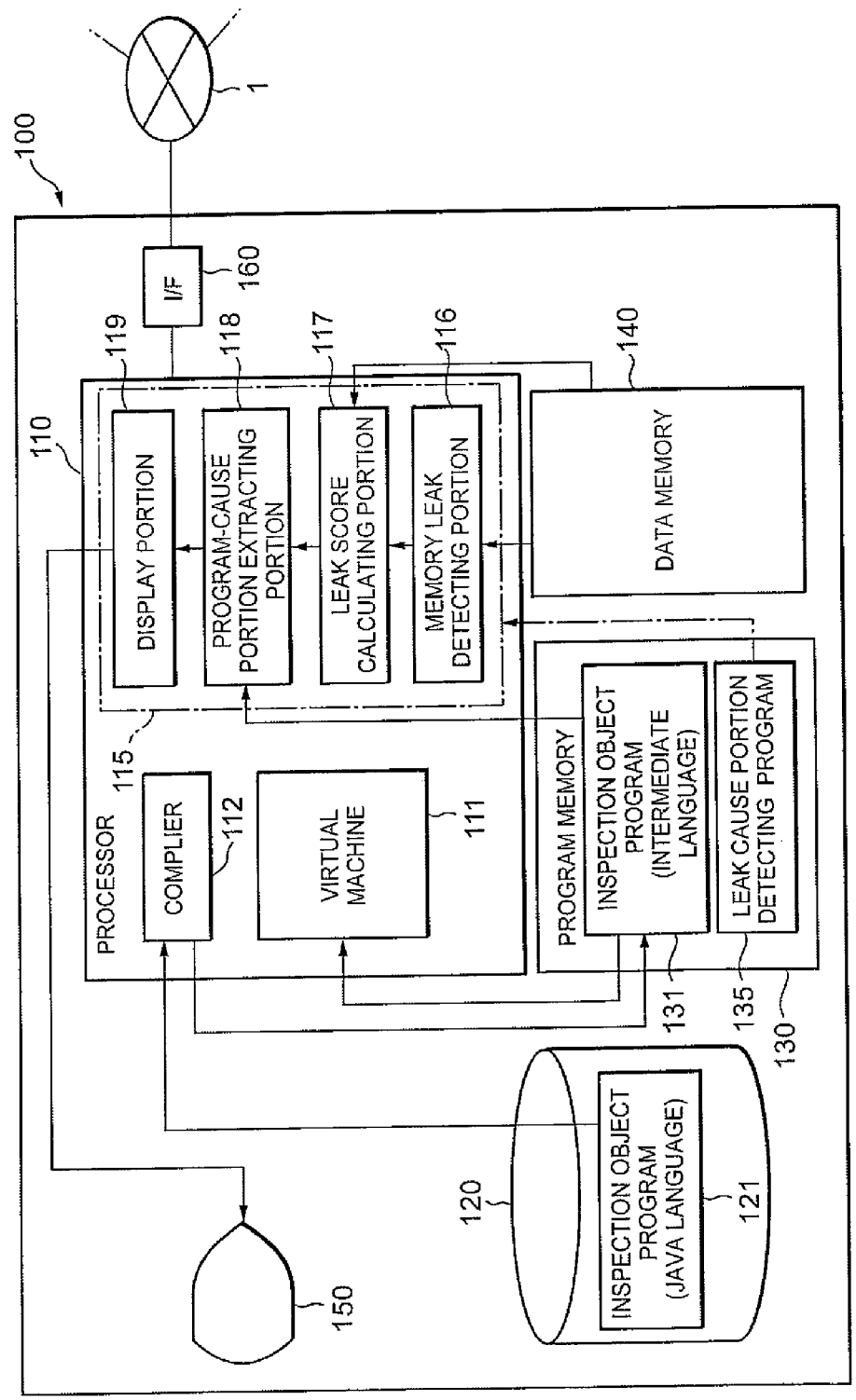
FIG. 1 is an explanatory view showing a configuration of a computer in an embodiment according to the invention.

FIG. 1 is a view showing a configuration of a computer 100 executing a method of detecting a memory leak causing portion according to the embodiment.

The computer 100 is a server connected to a network 1. The server 100 is provided with a processor 110 for executing various processings, a program memory 130 stored with various programs 131, 135 executed by the processor 110, a data memory 140 stored with various data, an external storage device 120, a display device 150, an interface 160 for communicating with other device via the network 1.

The external storage device 120 is stored with a program 121 for executing a Web service provided by the server 100. The program 121 is described in Java language.

The program memory 130 is stored with a program 131 in which the program 121 in Java language stored in the external storage device 120 is converted into an intermediate language, and the program 135 for detecting a memory leak causing portion produced by executing the program 131.

The processor 110 functionally includes a compiler 112 which converts the program 121 stored in the external storage device 120 from Java language to the intermediate language, a virtual machine 111 which executes the program 131 described in the intermediate language, and a leak cause portion detecting portion 115 which functions by executing the program 135 for detecting a memory leak causing portion. Further, both of the compiler 112 and the virtual machine 111 function by executing a program (not illustrated) stored in the program memory 130. The virtual machine 111 is provided with the garbage collection function described in the background art. Unnecessary data is collected from the data memory 140 by the garbage collection function. The leak cause portion detecting portion 115 includes a memory leak detecting portion 116 which detects memory leak by monitoring a memory using amount of the data memory 140, a leak score calculating portion 117 which calculates leak score of a plurality of data stored in a heap region in the data memory 140, a program cause portion extracting portion 118 which extracts a portion of the programs described with data having high leak score from the inspection object programs 121, 131, and a display portion 119 for making the display device 150 display results of the above-described respective portions.

Further, although there are the program memory 130 stored with programs and the data memory 140 stored with data according to the embodiment, it is sufficient in the present invention that both a program region and a data region may be present in a memory and it is not necessary that memories are present in the respective regions. Further, although in this case, the inspection object programs 121, 131 and the leak cause portion detecting program 135 are executed in the single computer 100, the respective programs may be executed by computers different from each other.

Next, operation of the memory leak detecting portion 116 will be explained in accordance with a flowchart shown in FIG. 2.

The memory leak detecting portion 116 executes an investigation on a using amount of the data memory 140 by n times (S11, S12), and determines whether memory leak is generated in the data memory 140 from a result of the investigation of n times (S13). When it is determined that memory leak is not generated, the processing is finished, and when it is determined that memory leak is generated, it is notified to the leak score calculating portion 117 (S14) and the processing is finished.

Figure 3:
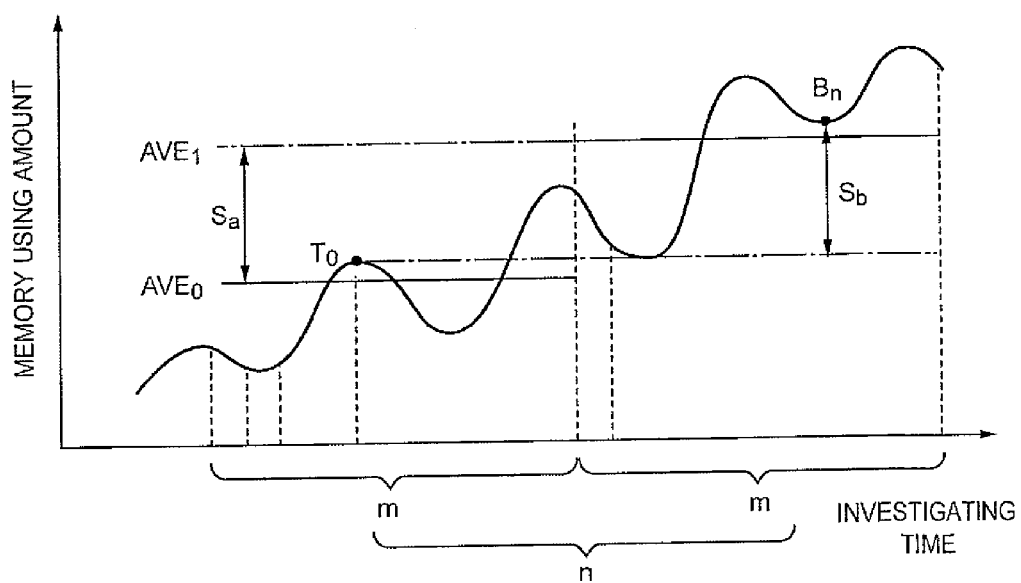
FIG. 3 is an explanatory diagram showing a change in a memory using amount along with an elapse of time.

Various methods are conceivable as a method of determining whether memory leak is generated in the data memory 140 from the result of the investigation of n times. For example, it may be determined that memory leak is generated when a difference Sa between an average value AVE0 of the using amounts in the initial m times of the investigation and an average value AVE1 of the using amounts in the investigation of later m times is larger than a predetermined value as shown by FIG. 3. Further, the ordinate in the drawing designates the memory using amount and the abscissa designates investigation time.

Further, it may be determined that memory leak is generated when a difference Sb between an initial maximum value T0 and a final minimum value Bn in the investigation of n times is larger than a previously determined value.

Next, operation of the leak score calculating portion 117 will be explained in accordance with a flowchart shown in FIG. 4.

Figure 5:
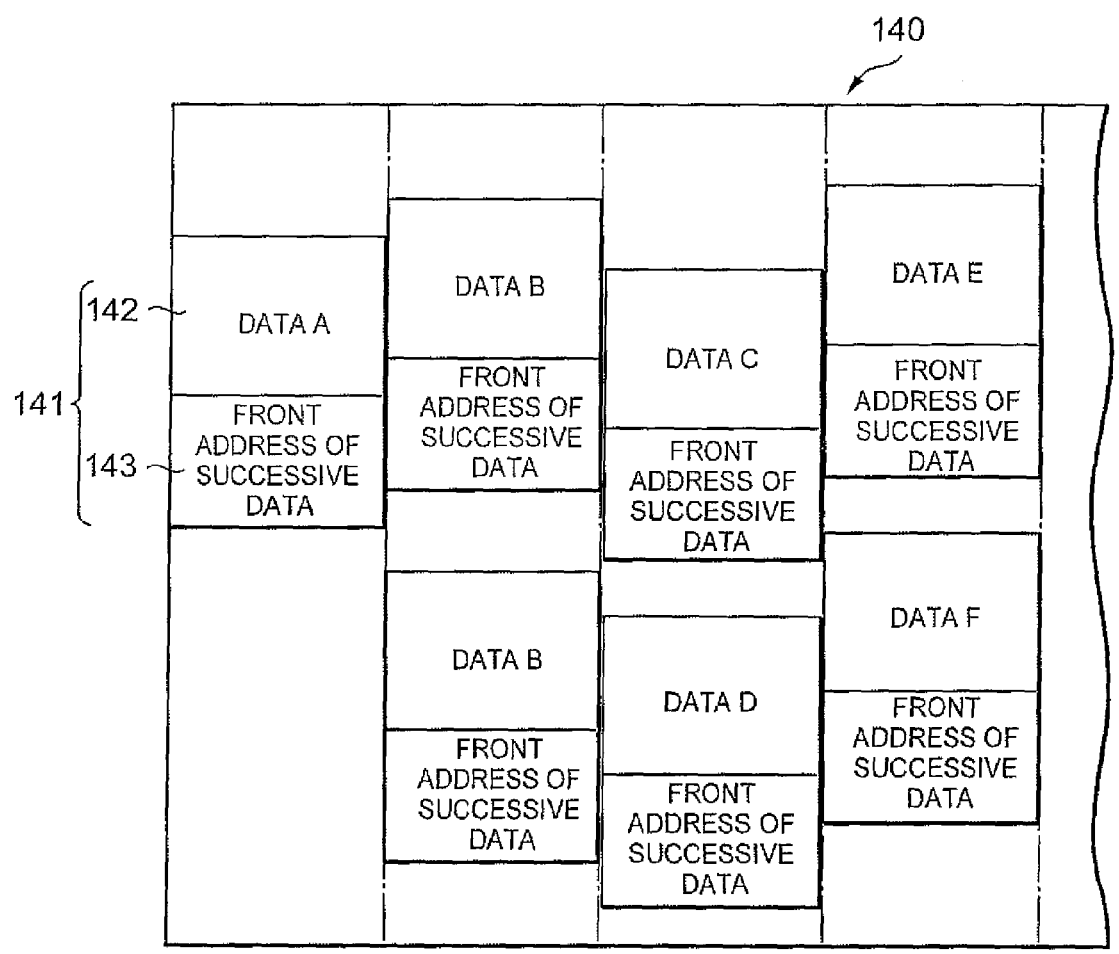
FIG. 5 is an explanatory view showing a data storing state in a data memory in an embodiment according to the invention.

First, the leak score calculating portion 117 grasps a data relationship with regard to all of data stored in the heap region of the data memory 140 (S21). Successively, thereafter, again, the data relationship is grasped with regard to all the data stored in the heap region of the data memory 140 (S22). By executing the inspection object program 135, as shown by FIG. 5, each data 141 stored to the heap region of the data memory 140 includes a payload field 142 constituting a main body of the data and a reference relationship field 143 indicating a front address of successive data and the leak score calculating portion 117 grasps the data relationship from the front address of the successive data stored in the reference relationship field.

Figure 6A:
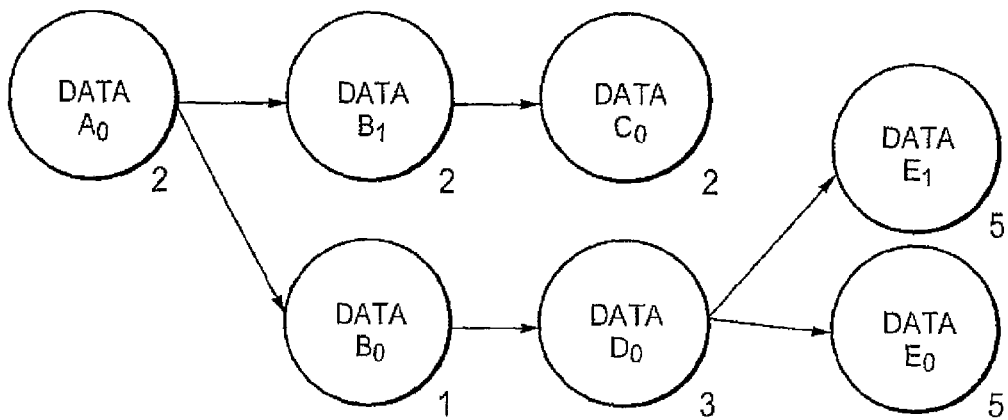
FIGS. 6A and 6B are explanatory views showing a reference relationship grasped at a reference relationship grasping step in an embodiment according to the invention.
Figure 6B:
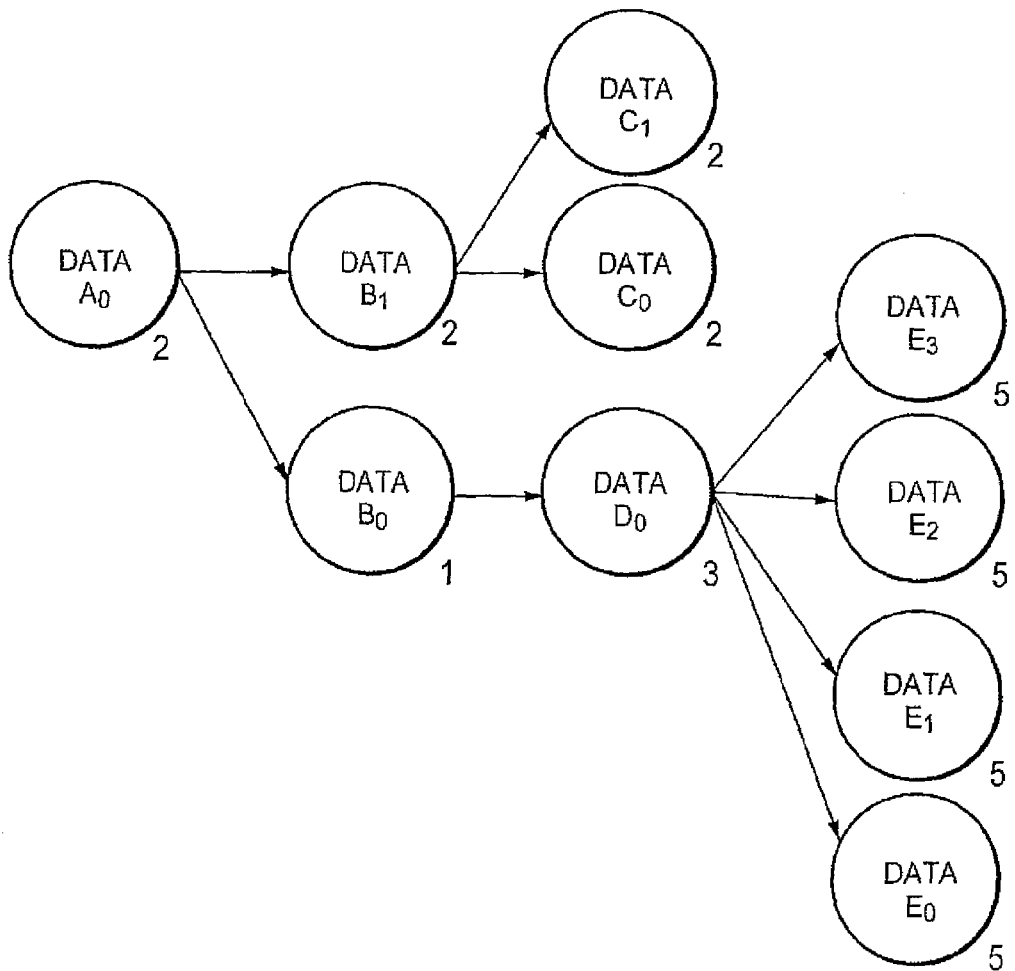

Here, assume that at the step of grasping the reference relationship of a first time (S21), for example, as shown in FIG. 6A, it is grasped that a data A0 refers to data B0, B1, data B1 refers to data C0, data B0 refers to data D0, and the data D0 refers to data E0, E1. Further, in the drawing, a circle designates data and a note on a right lower side of the circle designates a data size. Further, data indicated by the same alphabet indicates the same kind of data, that is, the data belongs to the same class in Java language. For example, data E0, E1 indicate data of the same E kind. Further, at the step of grasping the reference relationship of a second time (S22), as shown in FIG. 6B, assume that it is grasped that data B1 grasped at the first grasping step of the reference relationship (S21) newly refers to data C1 and data D0 newly refers to data E2, E3.

Figure 2:
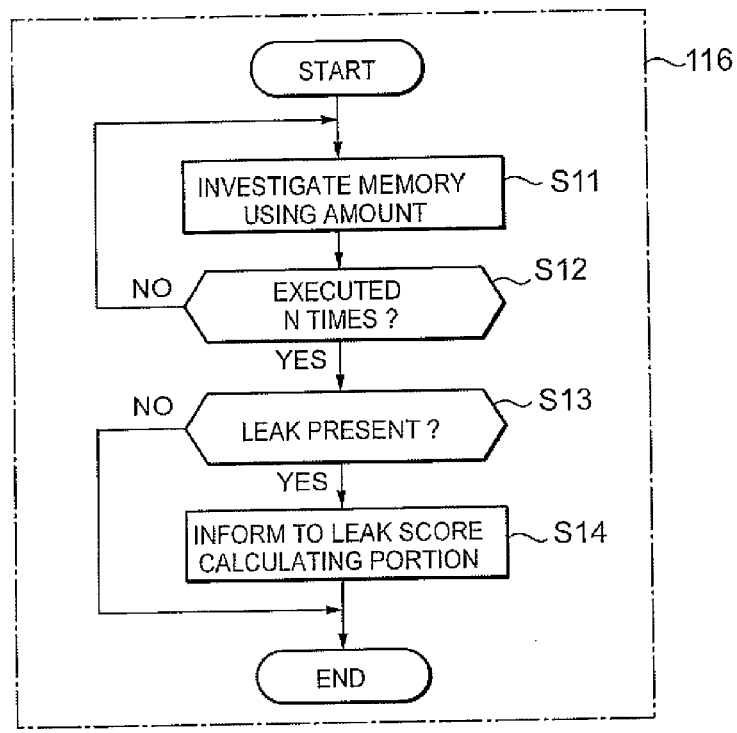
FIG. 2 is a flowchart showing an operation of a memory leak detection portion in an embodiment according to the invention.

Meanwhile, the first grasping step of the reference relationship (S21) is executed in accordance with a timing of executing the step of investing the memory using amount (S11) shown in FIG. 2 at an initial time. Further, the step of grasping the reference relationship of the second time (S22) is executed after having been informed that memory leak is generated by executing the step of informing to the leak score calculating portion shown in FIG. 2. Further, although here, the step of grasping the reference relationship of the second time (S22) after having been informed that memory leak is generated, at each time of the steps of investigating the memory using amount of n times shown in FIG. 2, the reference relationship grasping step may be executed, the reference relationship grasping step of the first time may be constituted by the reference relationship grasping step of the initial time, and the reference relationship grasping step of the second time may be constituted by a reference relationship grasping step when informed that memory leak is generated. Further, although here, memory leak is detected by the memory leak detecting portion 116, the reference relationship grasping step of the second time (S22) may be executed after a previously determined period of time after the reference relationship grasping step of the first time (S21), without executing detection of leak. As a previously determined time period, when the inspection object program is a program for providing a Web service which is continuously executed for an extremely long period of time as in the embodiment, a time period of, for example, three days, or one week or the like is conceivable.

When the reference relationship grasping step of the second time (S22) has been finished, the leak score calculating portion 117 extracts newly increased data from a plurality of data constituting the reference relationship grasped at the reference relationship grasping step of the first time (S21) from a plurality of data constituting the reference relationship grasped at the reference relationship grasping step of the second time (S22) and attaches a weight to the increased data (S23).

Figure 7:
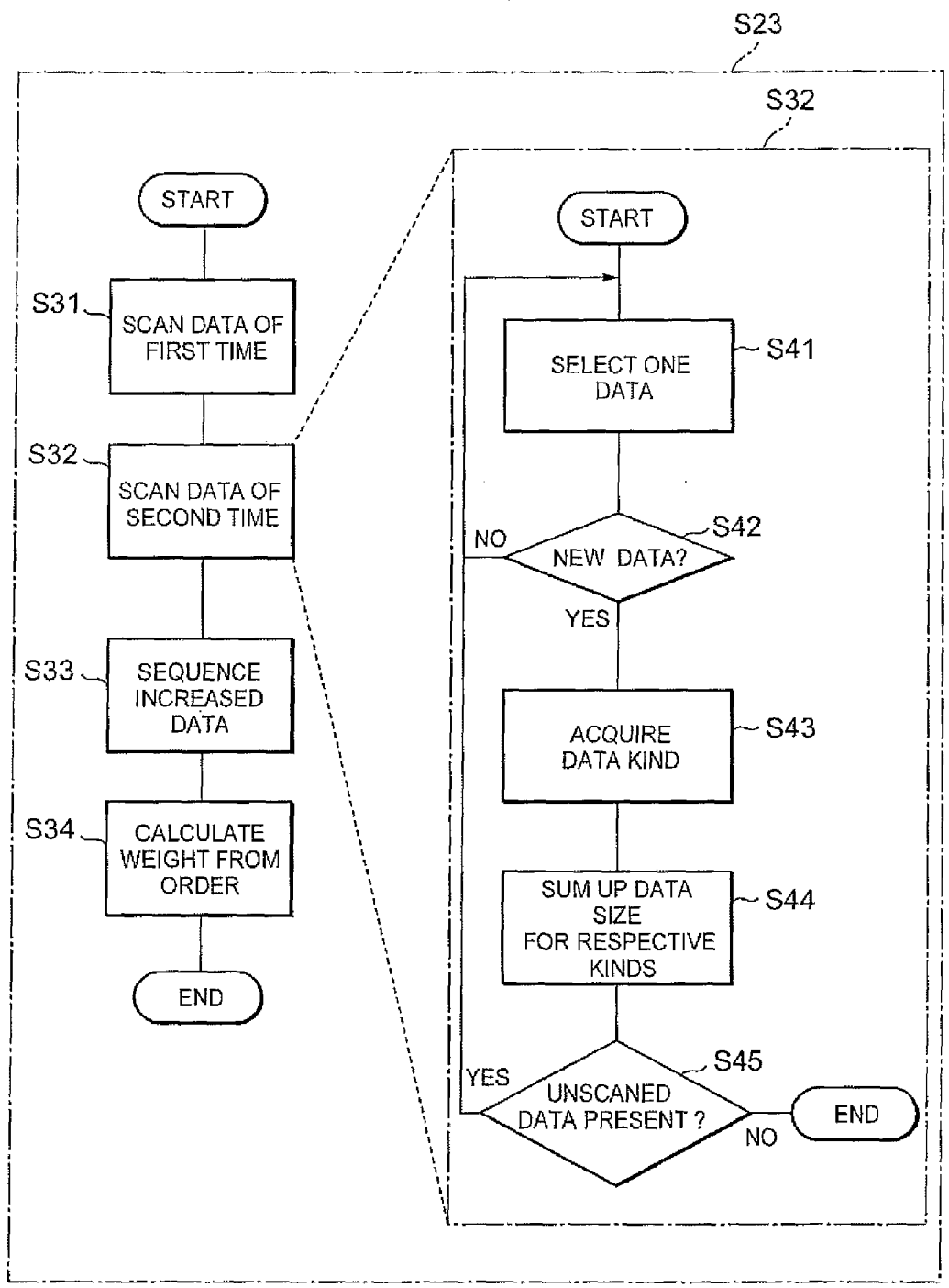
FIG. 7 is a detailed flowchart of S23 in the flowchart of FIG. 4.

Here, an explanation will be given of a procedure of extracting the newly increased data and attaching the weight thereto (S23) in accordance with a flowchart shown in FIG. 7.

First, the leak score calculating portion 117 scans a plurality of data whose reference relationship was grasped at the above-described reference relationship grasping step of the first time (S21)(S31) and successively scans the plurality of data whose reference relationship was grasped at the above-described reference relationship grasping step of the second time (S22)(S32). In scanning the data whose reference relationship was grasped at the reference relationship grasping step of the second time, first, one piece of data (datum?) is selected from the plurality of data whose reference relationship was grasped at the reference relationship grasping step of the second time (S41), and it is determined whether the data is the same as one of the plurality of data whose the reference relationship was grasped at the reference relationship grasping step of the first time, that is, whether the data is new data (S42). When the data is not new data, the operation returns again to step 41, and when the data is new data, the operation acquires a kind of the data (S43). Here, a kind of data is an aggregation of data having a constant relationship among data and corresponds to a class to which the data belong in Java language as described above. Further, a data size is summed up for each data kind (S44), it is determined whether there is data which is not scanned yet (S45), and when there is the data which is not scanned, the operation returns to S41 and when there is not data which is not scanned, the operation is finished.

Figures 8, 9:
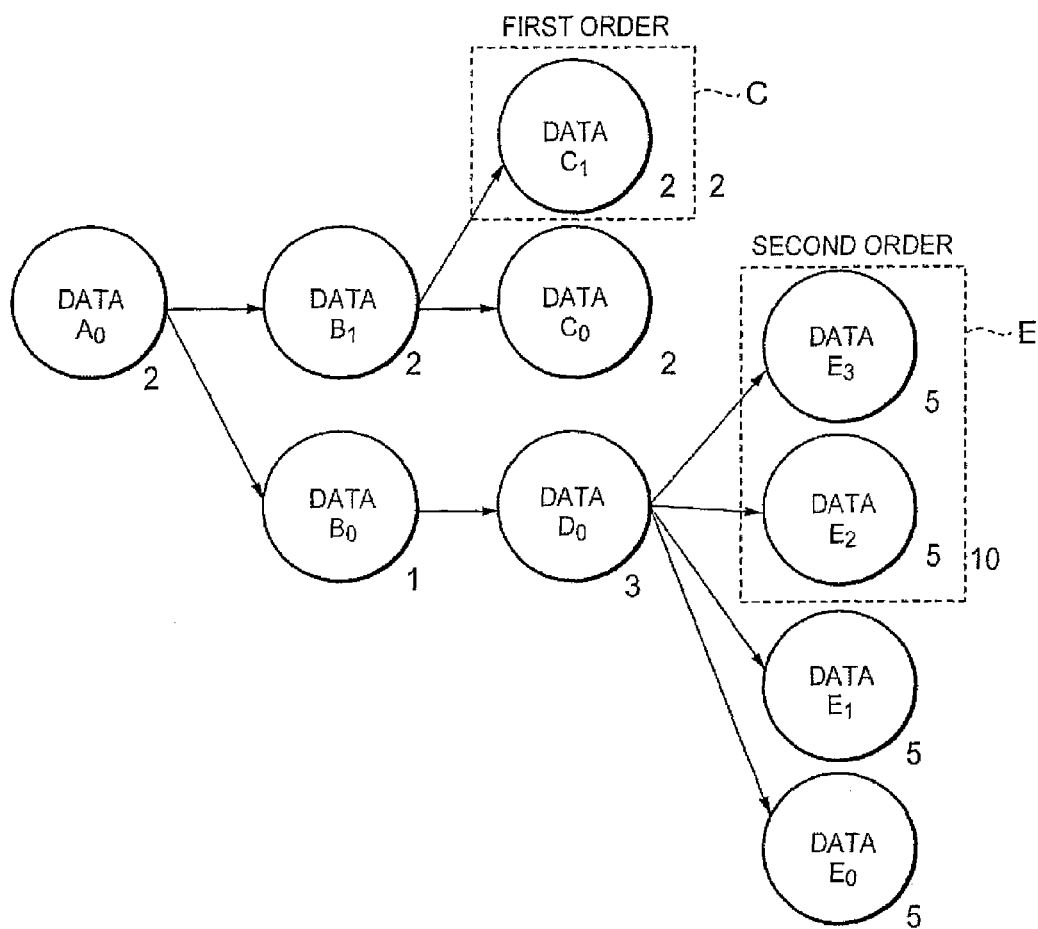
FIG. 8 is an explanatory view showing extraction of increased data and sequencing thereof in an embodiment according to the invention.
FIG. 9 is an explanatory view showing an example of a weight of each increased data in an embodiment according to the invention.

When scanning of data whose reference relationship was grasped at the reference relationship grasping step of the second time (S32) has been finished, as shown by FIG. 8, data C1 and data E2, E3 are extracted as newly increased data, and the data are classified into an aggregation of a data C kind and an aggregation of a data E kind and summed-up data sizes of the respective data kinds are acquired. Specifically, data C1 is aggregated as the data C kind and data E2, E3 are aggregated as the data E kind. Further, as the summed-up data size of the data C kind, "2" is acquired and as the summed-up data size of the data E kind, "10 (=5+5)" is acquired. Further, in the drawing, a numerical value attached on a left lower side of each data indicates a data size.

The leak score calculating portion 117 successively sequences respective data kinds in an order of increased data kinds having smaller data sizes (S33). Here, as shown by FIG. 8, the data kind C having the smaller summed-up data size in the increased data kinds C, E becomes at a first order and the data kind E becomes at a second order.

Next, the leak score calculating portion 117 attaches weights to each of the increased data kinds C, E in accordance with orders thereof (S34) to thereby finish the step of extracting the increased data and attaching the weight to the respective increased data (S23). With regard to the weights attached to respective increased data kinds, specifically, as shown by weight example 1 in FIG. 9, the orders attached at S33 are attached as the weights as they are. Further, although the weights may be constituted by the orders as they are in this way, the weights may be constituted by data size ratios as in weight example 2 of FIG. 9. That is, in accordance with a data size, data having a large data size may be attached with a large weight and data having a small data size may be attached with a small weight. Further, although here, data is classified into data kinds and the weights are attached for respective data kinds, the weights may be attached to respective data without classifying the data by the data kinds.

Figure 4:
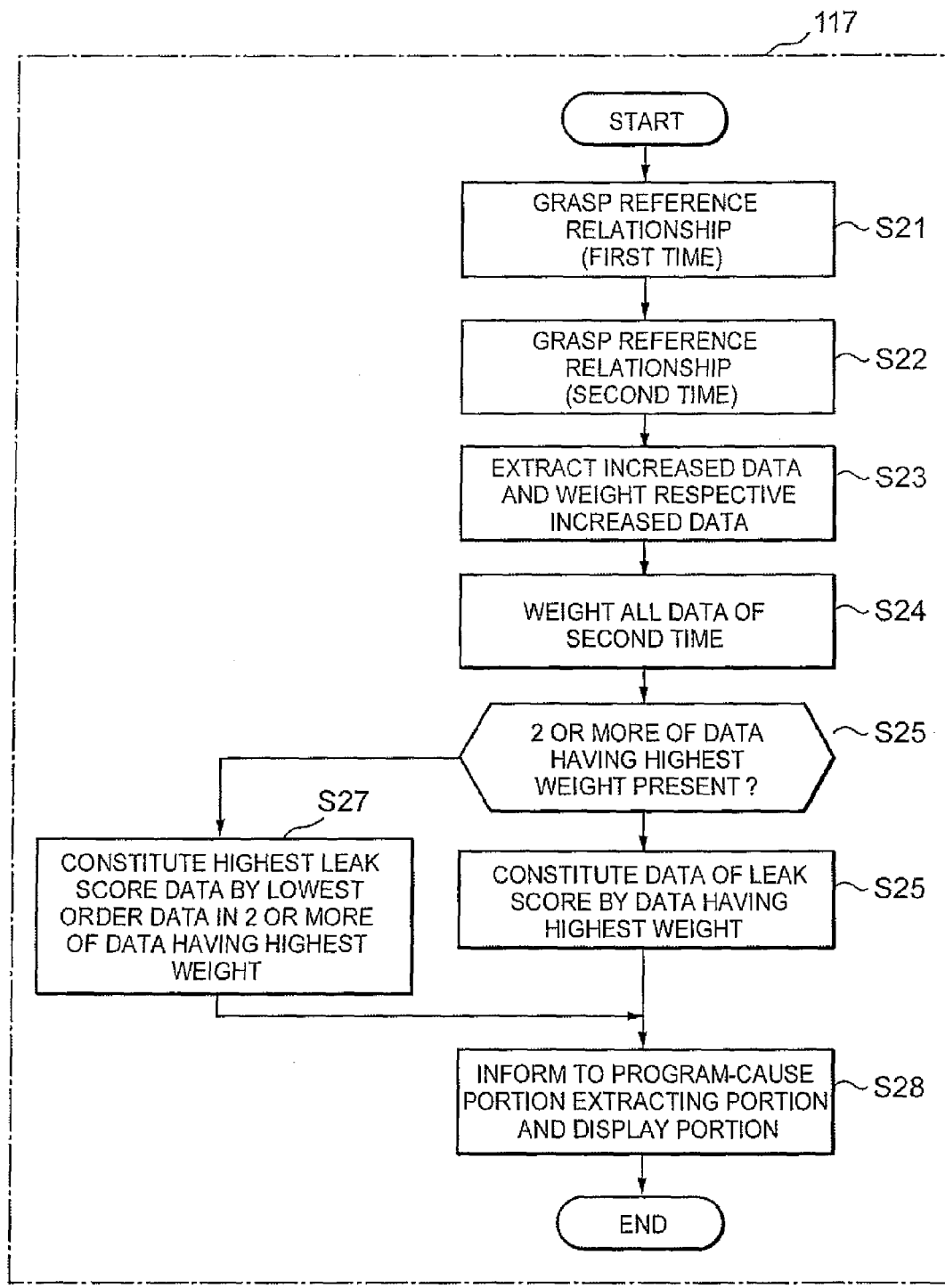
FIG. 4 is a flowchart showing an operation of a leak score calculating portion in an embodiment according to the invention.

When the step of S23 has been finished, as shown by the flowchart of FIG. 4, weights are attached to all the data grasped at the reference relationship grasping step at the second time (S22) (S24). That is, a weight of the increased data at a lowest order is successively propagated to higher order data constituting a source of reference.

Figure 10:
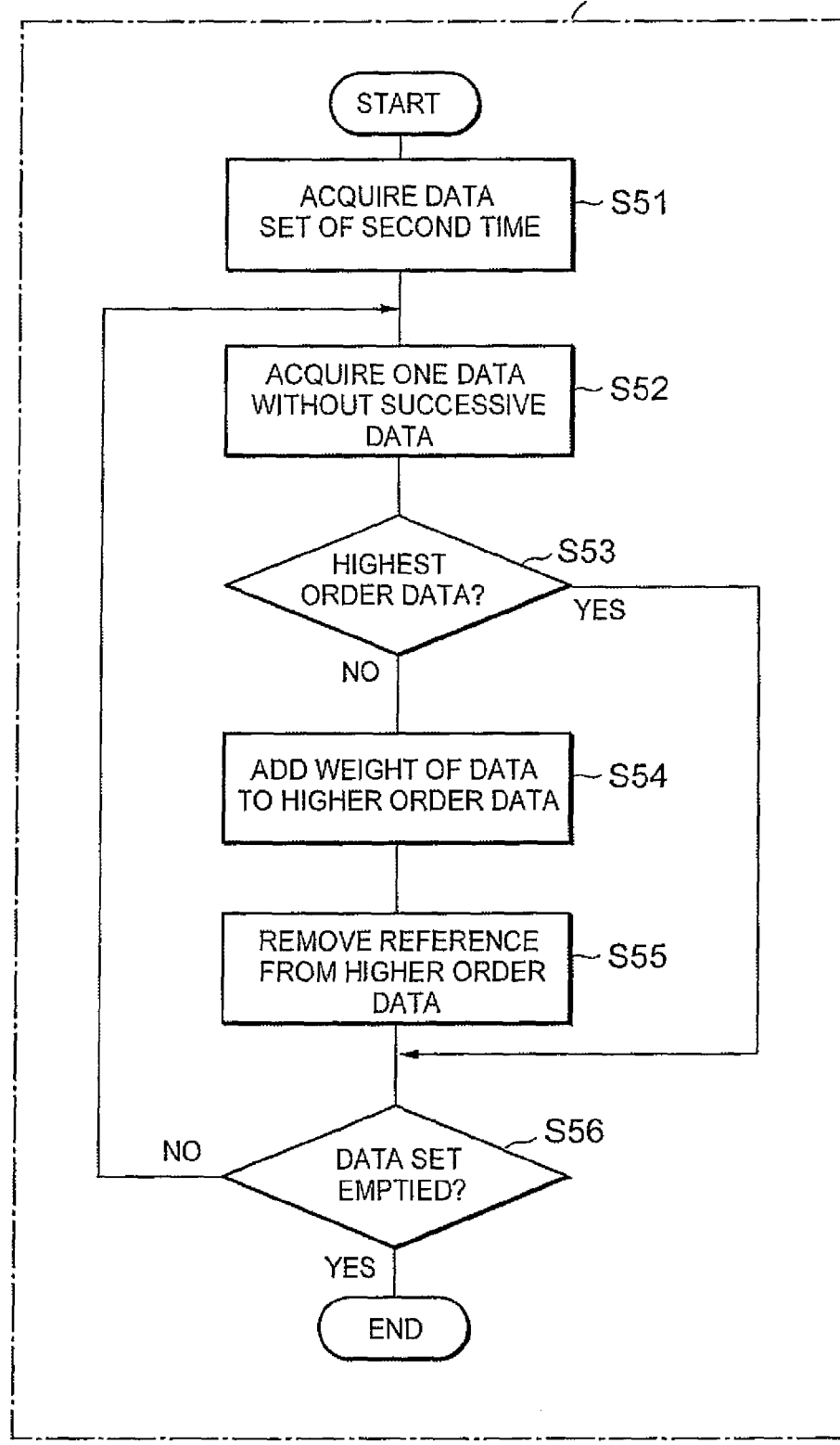
FIG. 10 is a detailed flowchart of S24 in the flowchart of FIG. 4.

Specifically, as shown by a flowchart of FIG. 10, first, the leak score calculating portion 117 acquires a set of all the data grasped at the reference relationship grasping step at the second time (S22) (S51) and acquires one piece of data which does have no successive data from the set of the data (S52).

Successively, it is determined whether the acquired data is the highest order data (S53), when the acquired data is the highest order data, the operation proceeds to S56 and adds the weight of the data to data at a higher order constituting a source of reference of the data (S54) when the acquired data is not the highest order data. Further, after removing the reference relationship of the data and the higher order data (S55), it is determined whether the set of the data is emptied (S56), when the set of the data is emptied, the processing is finished and when the set of the data is not emptied, the operation returns to S52. At S52, as described above, one piece of data which has no successive data is acquired from the set of the data. In this case, at the previously executed processing of S55, as the reference relationship between the increased data at the lowest order and the data of the data higher than that of the lowest order data is removed, the higher data becomes a data which has no successive data and therefore, the data is acquired. That is, by repeating the processing of S52 through S56, the weight of the increased data is successively propagated to the higher order data.

Figure 11:
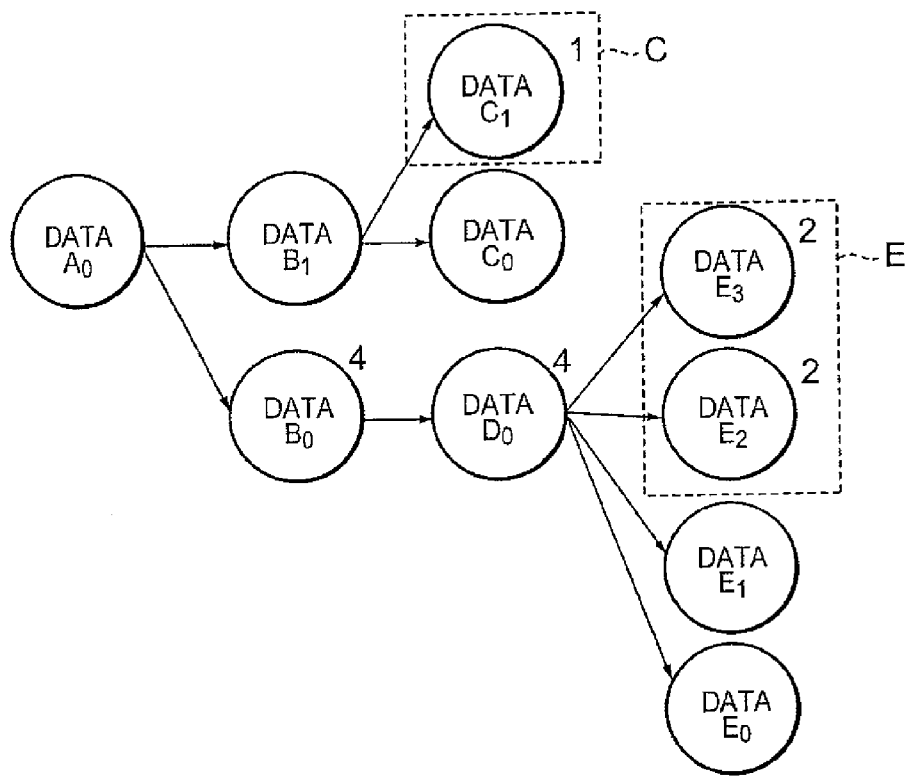
FIG. 11 is an explanatory view (part 1) for explaining weighting respective data having a data relationship in an embodiment according to the invention.

For example, as shown by FIG. 11, when data C1 is acquired by the processing of S52, a weight "1" of data C1 is added to data B1 being the higher order data of the source of reference of the data C1 and a weight of data B1 is set to "1". Further, in the drawing, a numerical value attached on a right upper side of respective data indicates the weight. Further, when data E2 is acquired in the processing of S52, a weight "2" of data E2 is added to data D0 constituting the higher order data of the source of reference of data E2. Further, when data E3 is acquired in the processing of S52 again, a weight "2" of data E3 is added to data D0 constituting the higher order data of the source of reference of data E3. As a result, the higher order data D0 is added with the weight "2" of data E2 and the weight "2" of data E3 and therefore, the weight of the higher order data D0 becomes "4". Further, when data D0 is acquired in the processing of S52, the weight "4" of data D0 is added to data B0 constituting data of the order higher than that of data D0 and the weight of data B0 is constituted by "4". The weight of data A0 at the highest order is added with the weights of data B0, B1 constituting lower order data of a destination of reference and therefore, the weight becomes "5".

Figure 12:
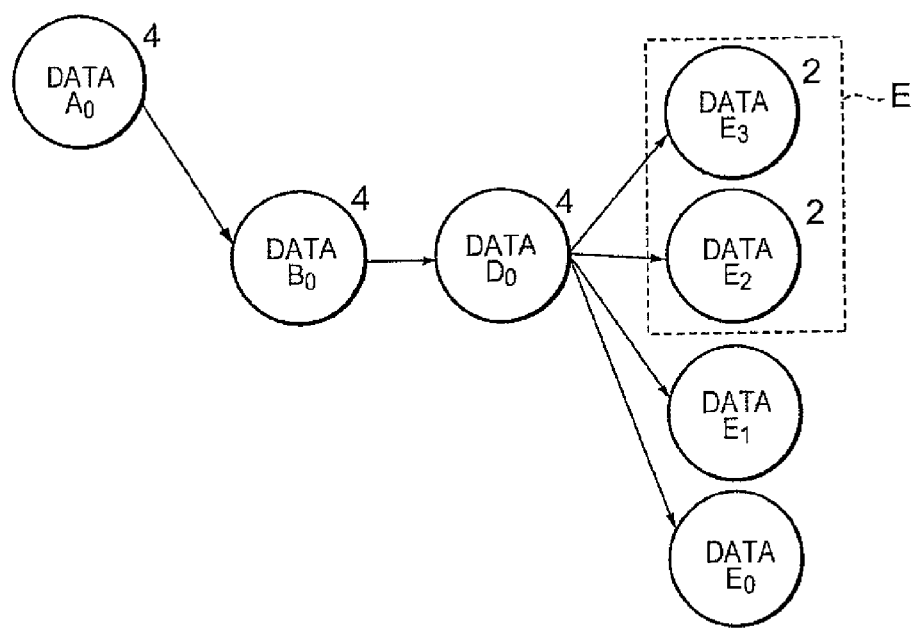
FIG. 12 is an explanatory view (part 2) for explaining weighting respective data having a data relationship in an embodiment according to the invention.

When S24 has been finished, as shown by the flowchart of FIG. 4, the leak score calculating portion 117 determines whether there are two or more of data having the highest weight (S25). In such a case, that is, when there is only one piece of data having the highest weight, the data is made to constitute the highest leak score data with regard to occurrence of memory leak (S26). Specifically, as shown by FIG. 11, when data having the highest weight "5" is constituted only by data A0 at the highest order, data A0 is made to constitute the highest leak score data. When there are two or more of data having the highest weight, data at a lowest order in the data is made to constitute the highest leak score data (S27). Specifically, as shown by FIG. 12, when there is only data B0 as data of a destination of reference of data A0 at the highest order and all of the leak scores of data D0, data B0, data A0 are 4, data D0 at a lowest order in the data is made to constitute the highest leak score data.

When the highest leak score data has been calculated (S26, 27), a data name of the highest leak score data and the leak score, a data name of data having a secondly higher leak score and the leak score, and a data name of data having a thirdly higher leak score and the leak score are informed to the program cause portion extracting portion 118 and the display portion 119. The display portion 119 is further informed of all the data grasped at the reference relationship grasping step of the second time (S22) and the reference relationship among the respective data (S28).

Figure 13:
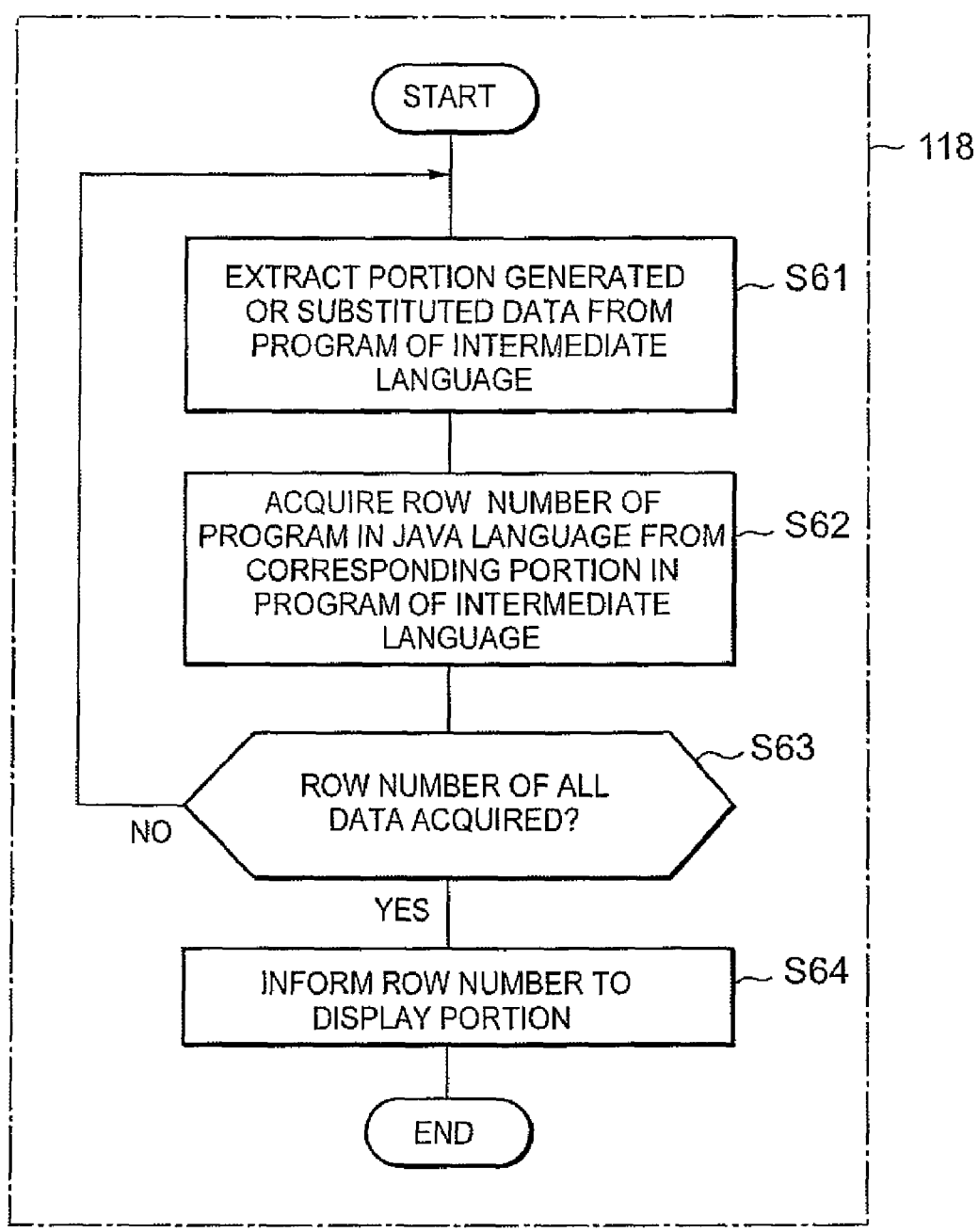
FIG. 13 is a flowchart showing an operation of a program cause portion extracting portion in an embodiment according to the invention.

Next, operation of the program cause portion extracting portion 118 will be explained in reference to a flowchart shown in FIG. 13.

When the program cause portion extracting portion 118 is informed of the name of the highest leak score data and the leak score from the leak score calculating portion 117, the program cause portion extracting portion 118 starts operation and extracts a portion where data of the name of the highest leak score data is generated or substituted from the inspection object program 131 described in intermediate language stored to the program memory 130 (S61). The inspection object program 131 described in the intermediate language is described with a row number of a corresponding portion in the inspection object program 121 described in Java language and therefore, after extracting the corresponding portion from the inspection object program 131 described in the intermediate language, the row number of the corresponding portion in the inspection object program 121 is acquired from a row number table set at a side of the corresponding portion (S62). Next, it is determined whether the row number of the substituted or generated portion is acquired with regard to all the data informed from the leak score calculating portion 117 and when the row number is acquired with regard to all the data, the operation proceeds to S64, and when the data which does not acquire the row number remains, the operation returns to S61. At S64, the respective row number with regard to all the data is informed to the display portion 119.

The display portion 119 displays information informed from the leak score calculating portion 117 and the program cause portion extracting portion 118 on the display device 150 as described above.

Figure 14:
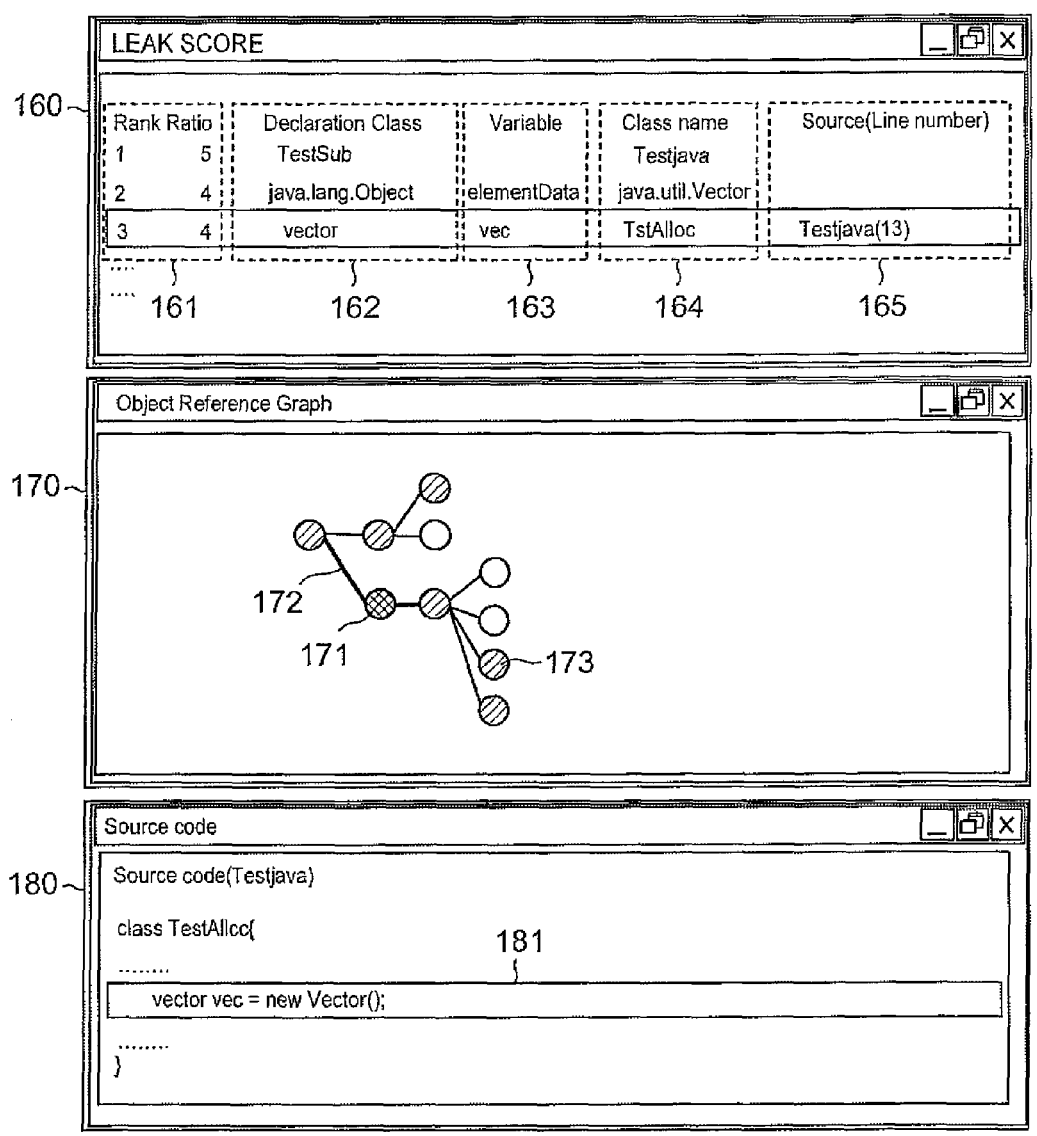
FIG. 14 is an explanatory view showing an information display example in an embodiment according to the invention.

Specifically, as shown by FIG. 14, the display device 150 displays a leak score ranking window 160, a reference relationship window 170, and a source code window 180.

The leak score ranking window 160 displays an order and a leak score 161, a declaration class 162, a data name 163, a class to which data belongs 164, a program source name and a row number 165 described with the corresponding data with regard to data having higher three orders of leak scores informed from the leak score calculating portion 117. Further, although according to the example shown in FIG. 14, the leak scores are aligned in an order of the higher score degrees from above, a display in an order of lower leak scores or leak scores classified by names can also be displayed.

The reference relationship window 170 displays a diagram showing all the data grasped at the reference relationship grasping step of the second time and the reference relationship among the respective data which are informed from the leak score detecting portion 117. According to the reference relationship diagram, an emphasized display 171 of data designated by the leak score ranking window 160 is executed. Further, a line 172 between nodes indicating the reference relationship is displayed by a boldness in accordance with the leak score. Further, with regard to data 173 displayed in the leak score ranking window 160, the data 173 is displayed by a different color etc. in order to differentiate from other data out of ranking. Further, although not illustrated here, the numerical value of the leak score calculated at the leak score calculating portion 117 may be displayed at a side of a node indicating data.

The source code window 180 displays a corresponding row 181 in the inspection object program 121 described in Java language with regard to data designated by the leak score ranking window 160 and the rows at the vicinities of the row. Contents of the rows are extracted from the inspection object program 121 in Java language stored to the external storing device 120. The corresponding row 181 is displayed in an emphasized manner to differentiate from other rows. Here, there is designated the data name "vec" at a third order of the leak score ranking in the leak score ranking window 160 and therefore, a row 181 using the data name "vec" is displayed in an emphasized manner.

A system controller executes a processing of changing a program of removing a corresponding element data from an array class with regard to the corresponding portion of the inspection object program 121 described in, for example, Java language or disconnecting the reference relationship of the corresponding element data by looking at the above-described display content. Further, the data the reference relationship of which is disconnected is collected from the data memory 140 by the above-described garbage collection function.

As described above, according to the embodiment, data having a high leak score is displayed along with the numerical value of the leak score, the reference relationship diagram of the data and the row of the inspection object program 121 described in Java language in which data having a high leak score is used are displayed and therefore, data constituting a source of generating memory leak is easily specified, further, time and labor of searching for the corresponding portion from the program 121 can be saved and labor required for investigating the source of-memory leak can considerably be reduced.

Further, although according to the above-described embodiments, the object of the invention is the program described in Java language, the invention is not limited thereto but so far as the program is a program described in a language capable of tracking a reference relationship among data with regard to a plurality of data stored in a memory without explicitly executing allocation and release of a region in the memory, a program described in any language can be the object of the invention.

Having described a preferred embodiment of the invention with reference to the accompanying drawings, it is to be understood that the invention is not limited to the embodiments and that various changes and modifications could be effected therein by one skilled in the art without departing from the sprit or scope of the invention as defined in the appended claims.

What is claimed is:

1. A method of detecting a memory leak causing portion generated in executing a program described in a programming language capable of tracking a reference relationship among a plurality of data pieces stored in a memory of a computer, where, regarding the reference relationship among the plurality of data pieces, a data piece referencing another data piece is higher order data, and said another data piece is lower order data, said method carried out by a computer system and comprising:

a first relationship grasping operation of grasping the presence or absence of the reference relationship among a plurality of data pieces stored in the memory;

a second relationship grasping operation of grasping the presence or absence of the reference relationship among the plurality of data pieces stored in the memory, at a time after the first relationship grasping operation;

an increased data extracting operation of extracting one or more data pieces of increased data which are not present in the plurality of data pieces whose reference relationship is grasped by the first relationship grasping operation, from the plurality of data pieces whose reference relationship is grasped at the second relationship grasping operation;

a weighting operation of attaching a weight to each data piece of said one or more data pieces of the increased data extracted at the increased data extracting operation, in accordance with data sizes of respective increased data, successively propagating and accumulating weights backwards along paths of reference from lower order data pieces of a destination of reference to higher order data pieces of a source reference so that the weights of said one or more data pieces of the increased data are propagated and accumulated as accumulated weights onto data pieces present in the plurality of data pieces whose reference relationship is grasped by the first relationship grasping operation, where the accumulated weights propagated onto the plurality of data pieces whose reference relationship is grasped by the first relationship grasping operation, are taken to represent respective data leak scores of respective data pieces, indicating degrees of possibility of respective data pieces being a source of the memory leak; and an outputting operation of outputting information of one or more respective data pieces having a high data leak, to indicate a possible source of the memory leak.

2. The method of detecting a memory leak causing portion according to claim 1, wherein in the weighting operation, one or more data pieces of the increased data are classified into respective data groups for respective data kinds, and the weights in accordance with data sizes of the respective data groups, are attached to the classified data groups.

3. The method of detecting a memory leak causing portion according to claim 1, comprising:
a highest leak score data extracting operation of extracting a lower order data piece as a data piece having a high possibility of causing a memory leak, in a situation where a plurality of data pieces having a common highest weight are present in respective weights of the plurality of data pieces having the reference relationship, and the plurality of data pieces having the highest weight has a relationship between the higher order data piece and the lower order data piece.

4. The method of detecting a memory leak causing portion, according to claim 2, comprising:
a highest leak score data extracting operation of extracting a lower order data piece as a data piece having a high possibility of causing a memory leak, in a situation where a plurality of data pieces having a common highest weight are present in respective weights of the plurality of data pieces having the reference relationship, and the plurality of data pieces having the highest weight has a relationship between the higher order data piece and the lower order data.

5. The method of detecting a memory leak causing portion according to claim 1, comprising:
a program cause portion extracting operation of extracting a portion of the program resulting in said one or more respective data pieces having the high data leak score indicating a possible source of the memory leak.

6. The method of detecting a memory leak causing portion according to claim 5;
wherein the program described in the programming language is a program executed by being converted into an intermediate language; and
wherein in the program cause portion extracting operation, the portion of the program resulting in said one or more respective data pieces having the high data leak score, is found from the program converted into the intermediate language, and then a corresponding portion corresponding to the portion thus found is extracted from the program described in the programming language.

7. The method of detecting a memory leak causing portion according to claim 1, comprising:
a displaying operation of displaying at least a result of the weighting operation.

8. The method of detecting a memory leak causing portion according to claim 1, wherein the outputting operation is a displaying operation of displaying information of one or more respective data pieces having a high data leak, to indicate a possible source of the memory leak.

9. The method of detecting a memory leak causing portion according to claim 1, wherein the outputting operation is a displaying operation of displaying the plurality of data pieces whose reference relationship is grasped at the second relationship grasping operation together with the reference relationships and the data leak scores of such plurality of data pieces.

10. A non-transitory computer-readable storage medium embodying a program carried out by a computer system, the program for detecting a memory leak causing portion generated in executing a subject program described in a programming language capable of tracking a reference relationship among a plurality of data pieces stored in a memory of a computer, where, regarding the reference relationship among the plurality of data pieces, a data piece referencing another data piece is higher order data, and said another data is lower order data, the program causing the computer to execute:
a first relationship grasping operation of grasping the presence or absence of the reference relationship among a plurality of data pieces stored in the memory;
a second relationship grasping operation of grasping the presence or absence of the reference relationship among the plurality of data pieces stored in the memory, at a time after the first relationship grasping operation;
an increased data extracting operation of extracting one or more data pieces of increased data which are not present in the plurality of data pieces whose reference relationship is grasped by the first relationship grasping operation, from the plurality of data pieces whose reference relationship is grasped at the second relationship grasping operation;
a weighting operation of attaching a weight to each data piece of said one or more data pieces of the increased data extracted at the increased data extracting operation, in accordance with data sizes of respective increased data,
successively propagating and accumulating weights backwards along paths of reference from lower order data pieces of a destination of reference to higher order data pieces of a source reference so that the weights of said one or more data pieces of the increased data are propagated and accumulated as accumulated weights onto data pieces present in the plurality of data pieces whose reference relationship is grasped by the first relationship grasping operation, where the accumulated weights propagated onto the plurality of data pieces whose reference relationship is grasped by the first relationship grasping operation, are taken to represent respective data leak scores of respective data pieces, indicating degrees of possibility of respective data pieces being a source of the memory leak; and
an outputting operation of outputting information of one or more respective data pieces having a high data leak, to indicate a possible source of the memory leak.

11. The medium according to claim 10, wherein in the weighting operation, one or more data pieces of the increased data are classified into respective data groups for respective data kinds, and the weights in accordance with data sizes of the respective data groups, are attached to the classified data groups.

12. The medium according to claim 10, the program causing the computer to further execute:
a highest leak score data extracting operation of extracting a lower order data piece as a data piece having a high possibility of causing a memory leak, in a situation where a plurality of data pieces having a common highest weight are present in respective weights of the plurality of data pieces having the reference relationship, and the plurality of data pieces having the highest weight has a relationship between the higher order data piece and the lower order data piece.

13. The medium according to claim 11, the program causing the computer to further execute:
a highest leak score data extracting operation of extracting a lower order data piece as a data piece having a high possibility of causing a memory leak, in a situation where a plurality of data pieces having a common highest weight are present in respective weights of the plurality of data pieces having the reference relationship, and the plurality of data pieces having the highest weight has a relationship between the higher order data piece and the lower order data.

14. The medium according to claim 10, the program causing the computer to further execute:
  a program cause portion extracting operation of extracting a portion of the program resulting in said one or more respective data pieces having the high data leak score indicating a possible source of the memory leak.

15. The medium according to claim 14;
  wherein the program described in the programming language is a program executed by being converted into an intermediate language; and
  wherein in the program cause portion extracting operation, the portion of the program resulting in said one or more respective data pieces having the high data leak score, is found from the program converted into the intermediate language, and then a corresponding portion corresponding to the portion thus found is extracted from the program described in the programming language.

16. The medium according to claim 10, the program causing the computer to further execute:
  a displaying operation of displaying at least a result of the weighting operation.

17. The medium according to claim 10, wherein the outputting operation is a displaying operation of displaying information of one or more respective data pieces having a high data leak, to indicate a possible source of the memory leak.

18. The medium according to claim 10, wherein the outputting operation is a displaying operation of displaying the plurality of data pieces whose reference relationship is grasped at the second relationship grasping operation together with the reference relationships and the data leak scores of such plurality of data pieces.

* * * * *